United States Patent [19]

Hudson, Jr.

[11] Patent Number: 4,753,989
[45] Date of Patent: Jun. 28, 1988

[54] ELASTOMER WITH IMPROVED HIGH TEMPERATURE CHARACTERISTICS

[75] Inventor: John A. Hudson, Jr., North Chelmsford, Mass.

[73] Assignee: Barry Wright Corporation, Newton Lower Falls, Mass.

[21] Appl. No.: 30,723

[22] Filed: Mar. 25, 1987

[51] Int. Cl.$^4$ .................... C08L 53/00; C08L 71/04
[52] U.S. Cl. ........................................ 525/92; 525/905
[58] Field of Search ............................... 525/92, 905

[56] References Cited

U.S. PATENT DOCUMENTS

| | | | |
|---|---|---|---|
| 3,485,787 | 12/1969 | Haefele et al. | 260/33.6 |
| 3,830,767 | 8/1974 | Condon | 260/28.5 B |
| 4,006,116 | 2/1977 | Dominguez | 260/33.6 AQ |
| 4,039,629 | 8/1977 | Himes et al. | 260/876 B |
| 4,041,103 | 8/1977 | Davison et al. | 260/857 D |
| 4,166,055 | 8/1979 | Lee, Jr. | 525/92 |
| 4,616,067 | 10/1986 | Lee et al. | 525/192 |

*Primary Examiner*—Jacob Ziegler
*Attorney, Agent, or Firm*—Hamilton, Brook, Smith & Reynolds

[57] ABSTRACT

A soft thermoplastic, elastomeric alloy containing a thermoplastic, elastomeric block copolymer material, a polyethylene, and a polyphenylene ether material, prepared by blending in an extruder with an L/D ratio equal to or greater than 30 to 1. The alloy comprises a blend of from about 80 to 98% thermoplastic, elastomeric block copolymer material; from about 1 to 10% by weight of low melt index, highly crystalline polyethylene; and from about 1 to 10% by weight of polyphenylene ether. The material demonstrates excellent creep resistance at elevated temperatures as well as a variety of other excellent physical properties.

5 Claims, No Drawings

ELASTOMER WITH IMPROVED HIGH TEMPERATURE CHARACTERISTICS

BACKGROUND OF THE INVENTION

Elastomers with thermoplastic properties have been produced using ABA block copolymers. These block copolymers are the subject of many patents including U.S. Pat. Nos. 3,485,787; 3,830,767; 4,006,116; 4,039,629; and 4,041,103 all assigned to the Shell Oil Company. These block copolymers exist as a styrene—ethylene—butylene—styrene molecular configuration. The overall strength of the polymer is provided by the polystyrene end blocks which act as aggregates or domains which serve as physical crosslinks. The rubbery portion of the polymer is provided by the ethylene—butylene blocks.

The highest temperature at which these block copolymers can operate is limited due to the absence of physical irreversible crosslinks such as those found in conventional elastomers. Additionally, the low glass transition temperature of the polystyrene end blocks further limits the elastomer service temperature. As a result, these ABA block copolymers exhibit a significant amount of creep when subjected to loads at elevated temperatures. This property makes them unsuitable for applications in which stress or load-bearing is required in elevated temperatures.

SUMMARY OF THE INVENTION

This invention relates to a soft polymer composition which exhibits excellent creep resistance at elevated temperatures.

More specifically, this invention pertains to a soft, thermoplastic, elastomeric, alloy comprising:
(a) from about 80 to 98% by weight of a soft styrene-ethylene-butylene-styrene block copolymer;
(b) from about 1 to 10% by weight of a crystalline polyethylene having a low melt index; and,
(c) from about 1 to 10% by weight of polyphenylene ether.

The alloy has a Shore A hardness of 32–45A; excellent creep resistance; excellent surface appearance; good tensile and elongation properties; ozone resistance; resilience; co-extrudability with polyolefins; and excellent processability and reprocessability.

The alloy is produced by:
(a) providing a mixture of:
(i) from about 80 to 98% by weight of a soft styrene-ethylene-butylene-styrene (SEBS) block copolymer;
(ii) from about 1 to 10% by weight of a crystalline polethylene having a low melt index; and,
(iii) from about 1 to 10% by weight of polyphenylene ether; and,
(b) extruding the mixture under shear conditions sufficient to incorporate the polyethylene and the polyethylene ether into the SEBS to produce the alloy.

These materials are useful in applications for which elastomers are needed at elevated temperatures. One example of such a use is in the shock mounting of fragile components inside computers.

DETAILED DESCRIPTION OF THE INVENTION

Triblock co-polymers are formed from a center polymer block having elastomeric properties and outer polymer blocks having thermoplastic properties. Examples of such triblock copolymers are styrene-isoprene-styrene; styrene-butadiene-styrene; and styrene-ethylene-butylene-styrene. Such triblock copolymers have the unique morphology of a glassy polystyrene domain in a rubbery matrix. They do not require conventional vulcanization or other post-processing because the glassy polystyrene acts as physical crosslinks.

As a means of increasing the ultimate service temperature of the material, it is possible to dissolve a second material into the endblocks of the triblock copolymer provided the second material is compatible with the material of the endblocks; raises the melting temperature (Tm) of the endblocks; and does not change the characteristics of the endblocks.

Similarly, the ultimate service temperature of the elastomeric portion may be increased by dissolving a material into the rubbery midblocks of the alloy; provided the material is compatible with the midblocks; raises the service temperature at which the midblocks begin to flow; and does not change the characteristics of the midblocks.

In this invention, a styrene-ethylene-butylene-styrene (SEBS) copolymer (marketed by the Shell Oil Company under the trade name Kraton) is provided. In this copolymer, the polystyrene endblocks act as aggregates or domains that serve as physical crosslinks to contribute to the overall strength of the elastomer. The ethylene-butylene segments constitute the rubbery portion of the polymer. When this SEBS polymer is heated, the polystyrene domains soften and flow under pressure.

With the polystyrene endblocks in a soft and flowable form, it is possible to dissolve a material into them which will increase their melting temperature. Polyphenylene ether (PPO) compounds (such as those marketed by the General Electric Co. under the trademark Noryl) have been found to be very suitable for raising the melting temperature the polystyrene endblock domains. Since the glass transition temperature (Tg) of pure poly (2,6 dimethylphenylene oxide) PPO-H is approximately 210° C. vs. approximately 95° C. for polystyrene, melt blending of small amounts of Noryl materials into soft Kraton materials have yielded compounds with lower creep levels when compared to materials filled with an equal amount of straight polystyrene.

Additional creep resistance may be accomplished by adding a low melt index (having a melt index less than about 0.1), crystalline polyethylene the SEBS copolymer. This polyethylene adds additional entanglements by associating with the rubbery midblock and preventing the elastomeric chains from disentangling over long periods of time. This effect is the result of the highly crystalline polyethylene forming microcrystalline domains with a higher service temperature than the surrounding amorphous midblocks. Also, the polyethylene may form additional physical irreversible crosslinks within these microcrystalline domains. The polyethylene is also desirable in that it is compatible with the elastomeric ethylene-butylene midblocks and does not change their characteristics.

An extrusion system is used with shear conditions sufficient to incorporate the Noryl and the crystalline polyethylene into the SEBS under the proper thermal conditions that are employed. This is due to the fact that it is very difficult to dissolve the high melting point PPO materials (Noryl) completely into the polystyrene endblocks of the triblock copolymer without degrading the elastomeric ethylene-butylene midblocks.

Early trials performed on single screw extruders with a screw length to diameter (L/D) ratio of 24 to 1 resulted in either unmelted Noryl domains within the product or degraded material with 10%-30% lower physical properties depending upon the melt temperature used. By using extruders with high shear conditions (L/D ratios equal to or greater than 30 to 1), a homogeneous thermoplastic elastomer with excellent properties is produced.

In one embodiment, the soft polymer elastomer is produced by providing a mixture which comprises:
(a) from about 80 to 98% by weight of soft, (e.g., about 26A to about 34A Shore durometer) SEBS triblock copolymer (e.g., Kraton);
(b) from about 1 to 10% by weight of polyphenylene ether/alloy (e.g., Noryl); and,
(c) from about 1 to 10% by weight of low melt index, highly crystalline polyethylene.

The materials are extruded in a high shear extruder such as a twin screw extruder (Leistritz, Model - 34mm) or a single screw extruder with a L/D ratio of 30 to 1 or greater at a temperature of about 425° F.-490° F.

In the preferred embodiment, the soft polymer elastomer is produced by providing a mixture which comprises approximately 94% by weight of soft SEBS triblock copolymer (Kraton), approximately 3% by weight of PPO (Noryl), and approximately 3% by weight of low melt index, highly crystalline polyethylene. These materials are extruded under high shear conditions using a twin screw extruder (Leistritz, Model - 32mm) or a single screw extruder with a L/D ratio of 30 to 1 or greater. The extrusion may be performed in the temperature range of 395°-425° F. as long as high shear conditions are maintained. If a high shear environment is not possible in the extrusion equipment employed, the extrusion may still be performed provided the extrusion temperature is in the range of approximately 422° F. to approximately 442° F.

The resultant alloy exhibits a Shore A hardness in the range of 32-45A and has excellent resistance to creep, excellent surface appearance, good tensile and elongation properties, ozone resistance, resilience, co-extrudability with polyolefin materials, and excellent processability and reprocessability.

This invention will now be more specifically illustrated by the following examples.

SPECIFIC EXAMPLES

EXAMPLE 1

A mixture containing about 96% by weight of Shell Kraton (SEBS; 30A Durometer), 2% General Electric Noryl EN 265, and about 2% by weight of Phillips Chemical Co. Marlex EHM 6003 (HDPE) was produced. Prior to mixing, the Noryl was heated for approximately 6 hours at 200° F. to ensure dryness.

The mixture was extruded using an extrusion apparatus having a Length to Diameter Ratio of 30:1. The screen packs in the extruder breaker plate were sequentially 20,40,60,80 and 20 Mesh. The melt temperature was maintained between 450° F. and 490° F. The extrusion screw speed was maintained between about 125 and 170 rpm and a compression ratio of greater than or equal to about 4:1 was maintained.

The resulting product had a Shore A hardness of 34A and excellent feel, appearance and creep resistance at elevated temperatures (150° F. -175° F).

EXAMPLE 2

A mixture containing about 92% by weight of Shell Kraton (SEBS; 30A Durometer), 6% General Electric Noryl EN 265, and about 2% by weight of Phillips Chemical Co. Marlex EHM 6003 (HDPE) was produced. When processed under the conditions outlined in Example 1, the resultant product had a Shore A hardness of 36A and excellent feel, appearance and creep resistance at elevated temperatures.

EXAMPLE 3

A mixture containing about 87% by weight of Shell Kraton (SEBS; 30A Durometer), about 8% by weight of General Electric Noryl EN 265, and about 5% by weight of Phillips Chemical Co. Marlex EHM 6003 (HDPE) was produced. When processed under the conditions outlined in Example 1, the resultant product had a Shore A hardness of 45A and excellent feel, appearance and creep resistance at elevated temperatures.

Industrial Applicability

This invention pertains to thermoplastic elastomeric alloys with improved high temperature characteristics. The alloys are useful in many applications in which an elastomeric compound is needed to operate under a load at elevated temperatures up to about 150° F. Specific uses are in shock mounting of computer components or other fragile mechanisms in conditions of elevated temperature.

Equivalents

Those skilled in the art will recognize or be able to ascertain, using no more than routine experimentation, many equivalents to the specific embodiments of the invention described herein. Such equivalents are intended to be encompassed by the following claims.

I claim:
1. A thermoplastic, elastomeric alloy, comprising:
(a) from about 80 to 98% by weight of styrene-ethylene-butylene-styrene block copolymer;
(b) from about 1 to 10% by weight of low melt index, cystalline polyethylene; and,
(c) from about 1 to 10% polyphenylene ether; said elastomeric alloy having a Shore A hardness of approximately 32 to approximately 45A.

2. A thermoplastic, elastomeric alloy comprising:
(a) approximately 94% by weight of styrene-ethylene-butylene-styrene block copolymer;
(b) approximately 3% by weight of low melt index, crystalline polyethylene; and,
(c) approximately 3% by weight of polyphenylene ether; said elastomeric alloy having a Shore A hardness of approximately 32 to approximately 45A.

3. A thermoplastic, elastomeric alloy comprising:
(a) approximately 96% by weight of styrene-ethylene-butylene-styrene block copolymer;
(b) approximately 2% by weight of low melt index crystalline polyethylene; and,
(c) approximately 2% by weight of polyphenylene ether; said elastomeric alloy having a Shore A hardness of approximately 32 to approximately 45A.

4. A thermoplastic, elastomeric alloy comprising:

(a) approximately 92% by weight of styrene-ethylene-butylene-styrene block copolymer;
(b) approximately 2% by weight of low melt index crystalline polyethylene; and,
(c) approximately 6% by weight of polyphenylene ether; said elastomeric alloy having a Shore A hardness of approximately 32 to approximately 45A.

5. A thermoplastic, elastomeric alloy comprising:

(a) approximately 87% by weight of styrene-ethylene-butylene-styrene block copolymer;
(b) approximately 5% by weight of low melt index crystalline polyethylene; and,
(c) approximately 8% by weight of polyphenylene ether; said elastomeric alloy having a Shore A hardness of approximately 32 to approximately 45A.

* * * * *